United States Patent [19]

Bessho et al.

[11] Patent Number: 4,901,213

[45] Date of Patent: Feb. 13, 1990

[54] FIVE-LEGGED CORE TYPE FREQUENCY TRIPLO-MULTIPLIER

[75] Inventors: Kazuo Bessho; Sotoshi Yamada, both of Kanazawa, Japan

[73] Assignee: Kanazawa University, Kanazawa, Japan

[21] Appl. No.: 207,309

[22] PCT Filed: Sep. 29, 1987

[86] PCT No.: PCT/JP87/00711

§ 371 Date: May 31, 1988

§ 102(e) Date: May 31, 1988

[30] Foreign Application Priority Data

Sep. 30, 1986 [JP] Japan .................. 61-230129

[51] Int. Cl.$^4$ .................................. H02M 5/16
[52] U.S. Cl. ...................... 363/12; 363/154; 363/172
[58] Field of Search ............ 363/9, 12, 154, 155, 363/171, 172

[56] References Cited

U.S. PATENT DOCUMENTS

| | | | |
|---|---|---|---|
| 2,616,070 | 10/1952 | Corbino | 363/12 |
| 3,040,230 | 6/1962 | Biringer | 363/12 |
| 3,040,231 | 6/1962 | Biringer | 363/12 |
| 3,263,148 | 7/1966 | Biringer | 363/12 |
| 3,295,050 | 12/1966 | Rowan et al. | 363/171 |
| 3,328,738 | 6/1967 | Broverman et al. | 363/154 |

Primary Examiner—Patrick R. Salce
Assistant Examiner—Jeffrey Sterrett
Attorney, Agent, or Firm—Spencer & Frank

[57] ABSTRACT

A magnetic frequency triplo-multiplier for use as a power source for metal melting furnaces and the like. The frequency triplo-multiplier has Y-connected primary windings that are resonant with each phase of a three-phase alternating-current power source and serially-connected secondary windings that are resonant with a triple frequency so as to produce a large single-phase power. The frequency triplo-multiplier uses a five-legged iron core, and capacitors connected in parallel with first, third and fifth leg windings of the five-legged iron core to bring about resonance with the three-phase alternating-current power source, while second and fourth leg windings of the five-legged iron core are connected in series and shunted by a capacitor so as to bring about resonance with a triple frequency. Thus, the disclosed frequency triplo-multiplier has a simple and light structure, low loss, high efficiency and excellent characteristics without distortions in the waveforms of both the currents and voltages at the input and output sides.

2 Claims, 5 Drawing Sheets

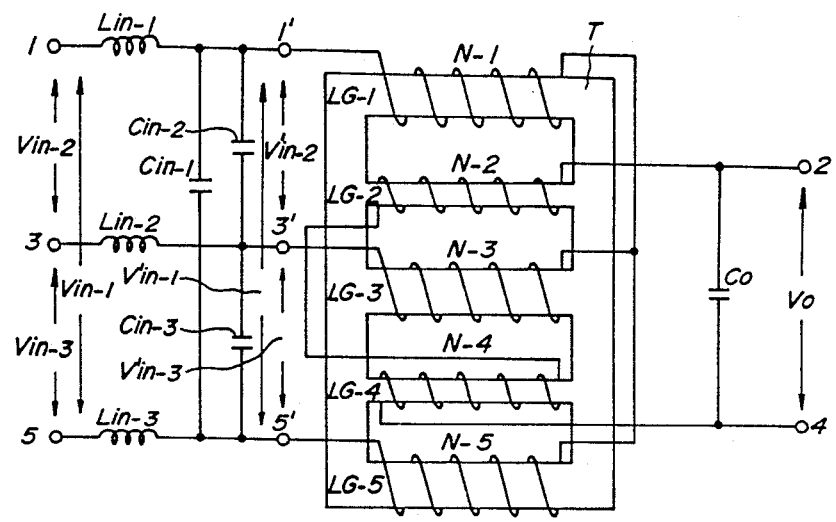
FIG_1

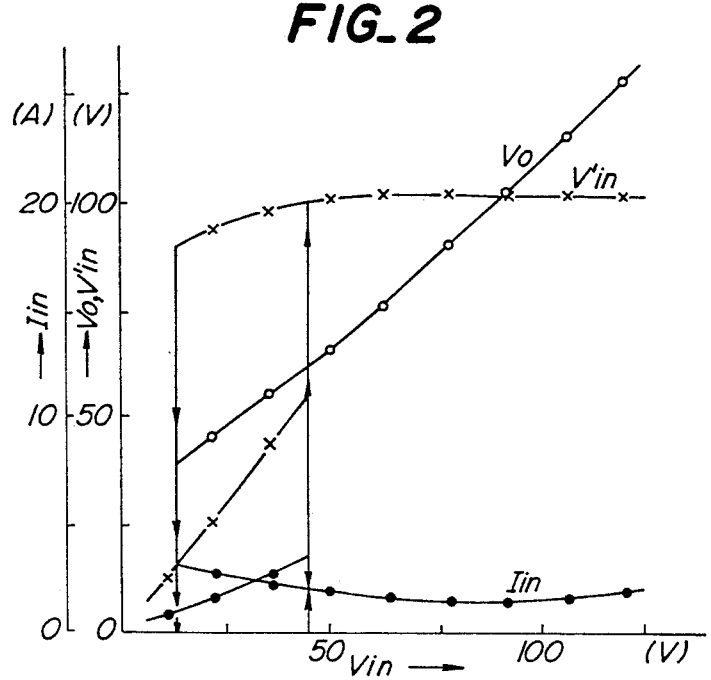
FIG_2
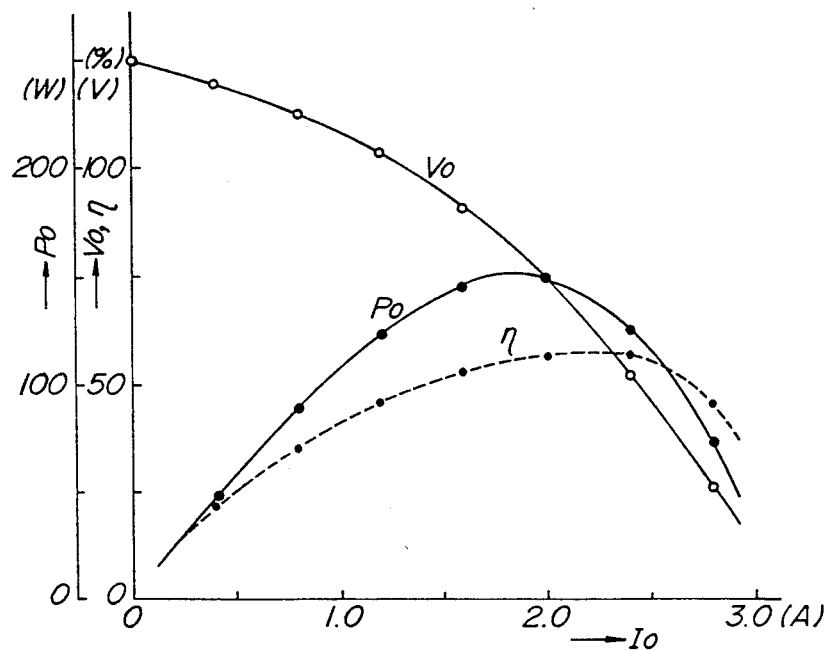
FIG_3

FIG_4
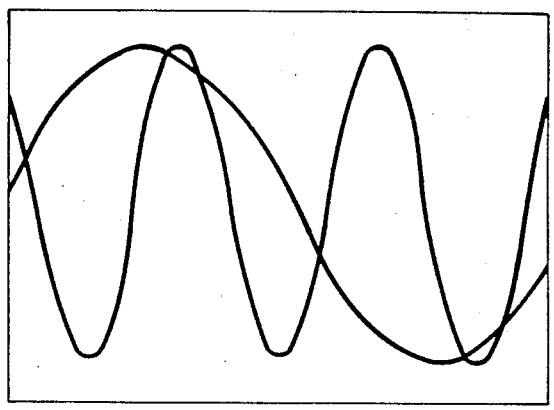

4,901,213

FIVE-LEGGED CORE TYPE FREQUENCY TRIPLO-MULTIPLIER

TECHNICAL FIELD

This invention relates to a magnetic frequency triplo-multiplier which is widely used as a power source for metal melting furnaces and the like. More particularly, the invention relates to a five-legged iron core type frequency triplo-multiplier that uses a five-legged core for structural simplification and to obtain increased capacity.

BACKGROUND ART

Conventionally, a magnetic frequency triplomultiplier, whose typical structure is shown in FIG. 5 for use with a three-phase input and a single-phase output, has been applied to power sources for furnaces to melt metal and the like. The capacity of such frequency triplo-multiplier is increasing these days, and a unit capacity of up to 6,000 KVA has been built recently. The illustrated frequency triplo-multiplier uses three saturation reactors ST-1, ST-2, ST-3 for three phases of a three-phase input. Their primary windings $W_{in}$-1, $W_{in}$-2 and $W_{in}$-3 are connected in $\Delta$, while their secondary windings $W_o$-1, $W_o$-2 and $W_o$-3 are connected in series. Serial inductances $L_{in}$-1, $L_{in}$-2 and $L_{in}$-3 and parallel capacitances $C_{in}$-1, $C_{in}$-2 and $C_{in}$-3 are connected to the input side of the primary windings so as to bring about resonance with the fundamental frequency of the input. A parallel capacitance $C_o$ is connected to the output side of the frequency triplo-multiplier so as to bring about resonance with the third harmonics, i.e., the triple frequency.

The operating principles of the frequency triplo-multiplier of the above construction is as follows; namely, the three cores ST-1, ST-2 and ST-3 are saturated by three-phase input voltages $V_{in}$-1, $V_{in}$-2 and $V_{in}$-3, and harmonics voltages are generated therein. Triple frequency component voltages $V_0$ of the harmonics, which are zero-sequence components, are extracted from the secondary side of the frequency triplo-multiplier. The illustrated embodiment has shortcomings in that a large number of harmonics are present in the input current, so that the input current is considerably distorted thereby causing adverse effects on the source of the three-phase input, and that loss is high and efficiency not very good. The above shortcomings are intensified with the increase of the capacity of the frequency triplo-multiplier, resulting in many practical problems.

To solve the above-mentioned shortcomings of the conventional structure, the inventors have proposed a modification of frequency triplo-multiplier as shown in FIG. 6. In this modification, an input resonant circuit similar to the preceding example is placed between the three-phase input voltages and the $\Delta$-connected primary windings of linear reactors LR and saturation reactors SR, which reactors are in series in each phase. The secondary windings of the serially-connected linear reactors LR and saturation reactors SR are also connected in series, so that a single-phase output voltage $V_o$ is extracted through an output resonant circuit $C_o L_o$. This modification has succeeded in reducing the distortion factor of the input current waveform to a level of one-fifth of the prior art device, but the number of reactors used is doubled to cause a 50% increase of the weight and a corresponding increase in cost.

As a means for solving the problems of weight and cost in the above modification in the past, the inventors have proposed a second modification of the frequency triplo-multiplier as shown in FIG. 7. In the second modification, an input resonant circuit similar to the preceding example is placed between three-phase input voltages and $\Delta$-connected windings of three-legged iron cores T. Each iron core T has a central leg $N_L$ with a gap and two side legs $N_S$, $N_z$, and windings on the central leg $N_L$ and one side leg $N_S$ are connected in series in each phase to form the above $\Delta$-connected windings. The windings on the remaining side legs $N_z$ of three-legged iron cores for the three phases are connected in series, so as to extract a single-phase output voltage $V_o$ by way of an output resonant circuit $C_o L_o$. Thus, the number of reactors in the second modification is the same as that of the conventional structure of FIG. 5. Thus, the increase of weight due to the use of many reactors in the first modification has been eliminated in the second modification, while the above-mentioned reduction of the distortion factor of the input current waveform to a level of one-fifth by the first modification is retained in the second modification. However, the second modification has a shortcoming in that its structure is somewhat complicated due to the use of a number of iron cores with comparatively complicated structure, and a room is left for further improvement.

SUMMARY OF THE INVENTION

An object of the invention is to solve the above-mentioned shortcomings of the prior art by providing a highly efficient frequency triplo-multiplier for use with a three-phase input and a single-phase output. In the frequency triplo-multiplier of the invention, the structure is simplified by using an iron core of simple formation and by reducing the number of iron cores, while excellent operating characteristics such as a low distortion factor of the input current waveform and low loss is ensured.

Another object of the invention is to simplify the structure of the frequency triplo-multiplier by using only one five-legged iron core for the reactors thereof and also to improve its operating characteristics to a great extent.

A five-legged iron core type frequency triplo-multiplier according to the present invention is characterized in that the present invention is formed in an iron core so as to close the magnetic circuits thereof, input coils are wound in a similar fashion on the first, third and fifth legs of the five-legged iron core, capacitors are connected between one side ends of the input coils, phase voltages of a three-phase alternating-current input are supplied to said one side ends of the input coils respectively while opposite side ends of the input coils are directly connected with each other, output coils are wound in a similar manner on second and third legs of the five-legged iron core, one side ends of the output coils are directly connected with each other while a capacitor is connected across opposite ends of the output coils, and a single-phase alternating-current output whose frequency is three times that of the three-phase alternating-current input is extracted.

According to the present invention, a frequency triplo-multiplier for magnetic engineering, power magnetics, electric machines and a wide variety of other applications can be made simply by the use of a single five-legged iron core, and excellent characteristics can be ensured with the simple structure; such as light weight, low loss, high efficiency, low distortion factor of the input current waveform, and the like.

BRIEF DESCRIPTION OF THE DRAWINGS

FIG. 1 is a circuit diagram which shows the formation of a five-legged iron core type frequency triplo-multiplier according to the invention;

FIG. 2 is a graph showing characteristic curves of the frequency triplo-multiplier, i.e., examples of input voltage versus input current and output voltage characteristics;

FIG. 3 is a graph showing characteristic curves, i.e., examples of load characteristics, of the frequency triplo-multiplier;

FIG. 4 shows waveforms of input and output voltages of the frequency triplo-multiplier;

PREFERRED EMBODIMENT OF THE INVENTION

Figure 5:
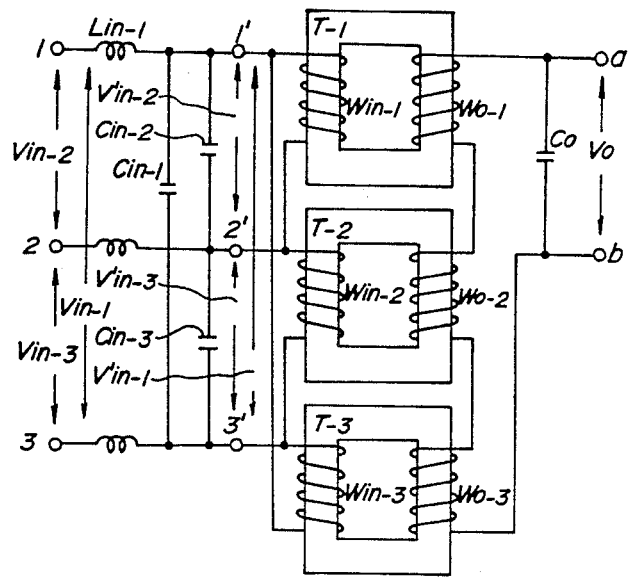
FIG. 5 is a circuit diagram showing formation of a conventional frequency triplo-multiplier.
Figure 6:
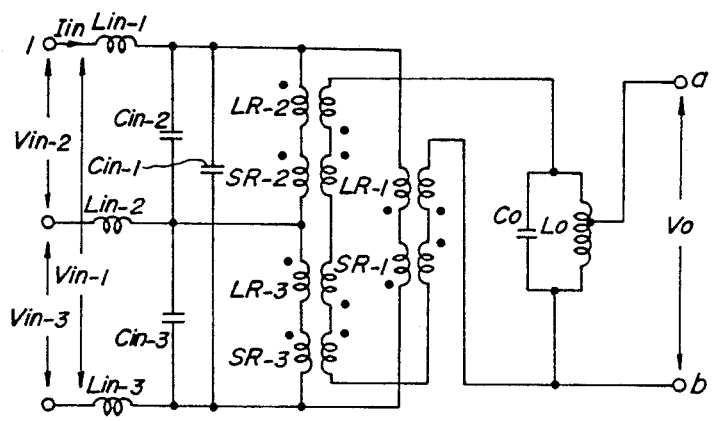
FIG. 6 is a circuit diagram showing formation of a previously suggested modification of the conventional frequency triplo-multiplier.
Figure 7:
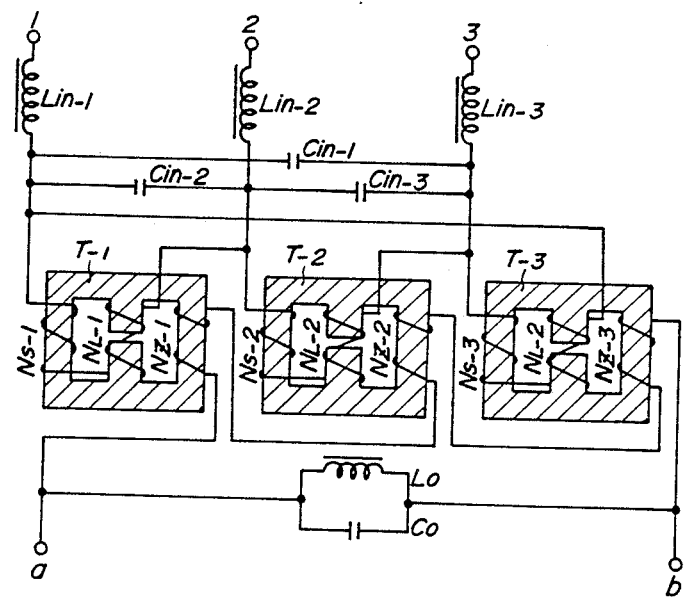
FIG. 7 is a circuit diagram showing formation of another previously suggested modification of the conventional frequency triplo-multiplier.

The invention will be described in further detail now by referring to an embodiment which is illustrated in the drawing.

FIG. 1 shows a practical example of circuit formation of a five-legged iron core type frequency triplo-multiplier according to the invention. In the formation of the figure, five-legged iron core T as an essential portion of the invention has three input legs, i.e., outermost legs LG-1, LG-5 and a central leg LG-3, and input windings N-1, N-5 and N-3 are wound on the similarly numbered legs in the same direction. Three capacitors $C_{in}$-1, $C_{in}$-2 and $C_{in}$-3 are connected, in delta, across input side ends 1', 5' and 3' of the input windings N-1, N-5 and N-3 respectively. Three linear reactors $L_{in}$-1, $L_{in}$-2 and $L_{in}$-3 are connected in series, between three-phase input ends 1, 5 and 3 and the above input side ends of the input windings respectively. The opposite side ends of the three input windings N-1, N-5 and N-3 are directly connected with each other, so that the input windings are Y-connected. Output windings N-2 and N-4 are wound on the output legs, or intermediate legs, LG-2 and LG-4 of the five-legged iron core T in the same direction respectively. The output windings are connected in series between single-phase output ends 2 and 4, and a capacitor $C_o$ is connected across the output ends 2 and 4 so as to be connected in parallel with the two output windings.

When balanced three-phase voltages are applied to the three-phase input ends 1, 3 and 5 of the above five-legged iron core type frequency triplo-multiplier, magnetic flux in each of the input legs LG-1, LG-3 and LG-5 of the five-legged iron core T is saturated, and magnetic flux of higher harmonics components is generated. The third harmonics flux, which is the strongest among the magnetic flux of the higher harmonics components, passes through each of the output legs LG-2 and LG-4 that are made comparatively thin. Thus, a single-phase voltage whose frequency is three times that of the three-phase input voltage is induced in each of the output windings N-2 and N-4 on the output legs LG-2 and LG-4. As a result, a single-phase output voltage $V_o$ of the triple frequency is produced across the output ends 2 and 4. In the above frequency multiplication, fundamental frequency components in the output legs LG-2 and LG-4 cancel each other, and no fundamental frequency voltage appears across the output ends 2 and 4.

The combination of the three linear reactors $L_{in}$-1, $L_{in}$-2 and $L_{in}$-3 connected in series on the input side and the three capacitors $C_{in}$-1, $C_{in}$-2 and $C_{in}$-3 connected in parallel on the input side are resonated with the fundamental frequency, so that higher harmonic distortion components generated on the input side are absorbed in the fundamental frequency wave. Thus, the above combination acts to keep the input voltage constant and to suppress the return of the higher harmonics distortion components to the power source of the input currents, and adverse effects of the higher harmonics on the power source are prevented.

In other words, the saturation of the five-legged iron core coacts with the resonance of the above combination, so as to produce excellent frequency triplo-multiplication. The capacitor $C_o$ connected across the output ends 2 and 4 and the output windings N-2 and N-4 on the output legs LG-2 and LG-4 of the five-legged iron core T are in series resonance for the third harmonics, and the saturation of the five-legged iron core T coacts with the above series resonance in producing a large single-phase output voltage of the triple frequency. Thus, the resonant circuit on the input side and the resonant circuit on the output side jointly produce a synergistic effect which produces excellent frequency triplo-multiplication characteristics.

FIG. 2 shows variations of the reactor winding input voltage $V_{in}'$, the reactor winding input current $I_{in}$, and the output single-phase voltage $V_o$ for different levels of three-phase input voltage $V_{in}$ applied to the input ends 1, 3 and 5 of the five-legged iron core type frequency triplo-multiplier of the invention with the above-mentioned formation. FIG. 3 shows the load characteristics of the frequency triplo-multiplier of the invention; namely, the variations of output voltage $V_o$, the output power $P_o$, and load efficiency $\eta$ for different levels of the output current $I_o$. FIG. 4 shows waveform examples of the input voltage $V'_{in}$ and the output voltage $V_o$. As can be seen from the curves of the above figures, the waveforms of the input and output voltages of the five-legged iron core type frequency triplo-multiplier of the invention have very little distortion, so that it provides excellent frequency triplo-multiplication characteristics with three-phase input and single-phase output.

CAPABILITY OF EXPLOITATION IN INDUSTRY

As described in detail in the foregoing, a five-legged iron core type frequency triplo-multiplier of the invention efficiently produces a single-phase output voltage of triple frequency from a three-phase input source voltage with excellent voltage and current waveforms having little distortion. In short, with the use of a single five-legged iron core of simple formation, the invention can reduce the weight of the frequency triplo-multiplier by 20% to 30% as compared with that of previously proposed modifications, so that an outstanding effect of providing excellent frequency triplo-multiplication characteristics at a low loss and at a high efficiency is achieved.

We claim:

1. A frequency triplo-multiplier for converting a three-phase input voltage having a predetermined input frequency to a single-phase output voltage having an output frequency which is three times said predetermined input frequency, said three-phase input voltage being coupled to first, second and third input terminals and said output voltage being applied to first and second output terminals, comprising:

an iron core having first, second, third, fourth and fifth legs, said third leg being interposed between said first and fifth legs, said second leg being interposed between said first and third legs and said fourth leg being interposed between said third and fifth legs;

first, second and third input windings each having first and second ends, said first, second and third input windings being sound of said first, third and fifth legs of said iron core respectively, the second ends of each of said first, second and third input windings being connected to a common point to form a Y-connection;

first, second and third linear reactors interposed between said first, second and third input terminals and the first ends of said first, second and third input windings respectively;

first, second and third input capacitors, said first input capacitor being connected between the first ends of said first and third input windings, said second input capacitor being connected between the first ends of said first and second input windings and said third input capacitor being connected between the first ends of said second and third input windings, said first, second and third linear reactors and said first, second and third input capacitors being resonant at said predetermined input frequency;

first and second output windings, said first and second output windings being wound on said second and fourth legs of said iron core respectively and being connected in series across said first and second output terminals; and a capacitor connected across said first and second output terminals, said first and second output windings and said capacitor being resonant at said output frequency, whereby said three-phase input voltage and said single-phase output voltage have waveforms which exhibit minimum distortion.

2. A frequency tripo-multiplier as defined by claim 1 wherein the second and fourth legs of said iron core have a smaller cross-section than the first, third and fifth legs of said iron core.

* * * * *